United States Patent
Duthel et al.

(10) Patent No.: US 11,949,498 B2
(45) Date of Patent: Apr. 2, 2024

(54) OPTICAL MODULATOR

(71) Applicant: Cisco Technology, Inc., San Jose, CA (US)

(72) Inventors: Thomas Duthel, Nuremberg (DE); Helmut Preisach, Besigheim (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 88 days.

(21) Appl. No.: 17/516,879

(22) Filed: Nov. 2, 2021

(65) Prior Publication Data
US 2022/0158752 A1    May 19, 2022

(30) Foreign Application Priority Data
Nov. 18, 2020 (GB) ...................................... 2018150

(51) Int. Cl.
| | | |
|---|---|---|
| *H04B 10/50* | (2013.01) | |
| *G02F 1/21* | (2006.01) | |
| *H04B 10/508* | (2013.01) | |
| *H04J 14/08* | (2006.01) | |

(52) U.S. Cl.
CPC .............. *H04J 14/08* (2013.01); *G02F 1/212* (2021.01); *H04B 10/5053* (2013.01); *H04B 10/508* (2013.01)

(58) Field of Classification Search
CPC ... H04J 14/08; H04B 10/508; H04B 10/5053; G02F 1/212
USPC .......................................................... 398/98
See application file for complete search history.

(56) References Cited

U.S. PATENT DOCUMENTS

| | | | |
|---|---|---|---|
| 9,979,472 B1* | 5/2018 | Wang .................... | H04B 10/532 |
| 2003/0058504 A1 | 3/2003 | Cho et al. | |
| 2010/0014862 A1* | 1/2010 | Suzuki .................... | H04J 14/02 398/79 |
| 2011/0097085 A1* | 4/2011 | Oda ....................... | H04B 10/516 398/65 |
| 2015/0215046 A1* | 7/2015 | Mekis .................. | G02B 6/4213 385/14 |
| 2016/0036532 A1* | 2/2016 | Noguchi .......... | H04B 10/50572 398/38 |
| 2016/0103382 A1* | 4/2016 | Liboiron-Ladouceur .................... H04B 10/516 385/3 |
| 2016/0112016 A1* | 4/2016 | Lakshmikumar ... H03F 3/45183 330/260 |

FOREIGN PATENT DOCUMENTS

EP          2317671 A1    5/2011

OTHER PUBLICATIONS

Combined Search and Examiner Report in counterpart GB Application No. 2018150.9, dated Apr. 26, 2021, 6 pages.
Yamazaki, et al., "Single-carrier 1-Tb/s PDM-16QAM transmission using high-speed InP MUX-DACs and an integrated OTDM modulator," Optics Express, vol. 23, No. 10, Optical Society of America, May 2015, 8 pages.

* cited by examiner

*Primary Examiner* — Mohammad R Sedighian
(74) *Attorney, Agent, or Firm* — Edell, Shapiro & Finnan, LLC

(57) ABSTRACT

An optical modulator comprises, as optical modulator components, first and second transmitter chains and a first optical time division multiplex, OTDM, generator arranged to receive time interleaved optical pulses generated by one of said optical modulator components.

16 Claims, 13 Drawing Sheets

US 11,949,498 B2

OPTICAL MODULATOR

PRIORITY CLAIM

This application claims priority to United Kingdom Patent Application No. 2018150.9, filed Nov. 18, 2020, the entirety of which is incorporated herein by reference.

TECHNICAL FIELD

The invention relates to optical modulators.

BACKGROUND

Known optical communication systems for long distance transmission networks (longhaul, ultra-longhaul, submarine) require usage of highly expensive Optical-Electronic (OE or EO) components for spectral efficiency to make best usage of fiber plant resources and available optical bandwidth. As cost structure is dominated by the fiber plant, this higher cost is acceptable when compared to direct detection schemes. However, with basic coherent transmission systems approaching a higher maturity level and widespread use, and in some instances where reach is reduced, it is desirable to gain even higher throughput per wavelength together with further improvements in spectral efficiency, for example where lowest possible cost per transmitted bit, density of pluggable modules and thermal properties on linecards come into consideration. Additionally, limitations of transmit optical signal-noise ratio (TX OSNR), optical components such as laser relative intensity noise (RIN) and other noise sources and impairments in the EO and/or OE head ends are factors, and the overall link performance, as well as the cost structure, is dominated by the transponders.

BRIEF DESCRIPTION OF THE DRAWINGS

Embodiments of the invention will now be described, by way of example, with reference to the drawings, of which.

DESCRIPTION OF EXAMPLE EMBODIMENTS

Overview

In overview, an optical modulator includes, as optical modulator components, first and second transmitter chains and a first optical time division multiplex (OTDM) generator arranged to receive time interleaved optical pulses generated by one of the optical modulator components.

EXAMPLE EMBODIMENTS

By way of technical background, provided the technological requirements in terms of analog bandwidth and OSNR can be met, different combinations of baudrate and order of Quadrature Amplitude Modulation (QAM) scheme can be used. The trend in industry, after the 400G(net) ZR approach currently being developed, may be to aim for a net rate of 800 Gbps, 1 Tbps, 1.2 Tbps. So, when adding the required forward error correction (FEC)/frame overhead (FOH), the gross bitrate approaches 1.5 Tbps/wavelength.

To go for a viable compromise between performance and cost means to push mainstream semiconductor technologies, available from the complementary metal oxide silicon (CMOS) integrated circuit (IC) industrial infrastructure, to its performance limits. Wafer scale and system-on-chip (SOC) including 2.5D/3D stacking approaches allow scaling down cost per transmitted bit. Design environments, test facilities, yield and reliability status of these technologies enable volume production for low cost devices. Challenges for coherent optics TX for DCI (Data Centre Interconnect) applications are cost per transmitted bit to be minimized and increase transmitted bits/wavelength beyond state-of-the-art; use of Double Density, Small Form Factor Hot Pluggable Module mechanics, e.g. Quad Small Form-factor Pluggable—Double Density QSFP-DD, which limits power consumption and thermal budget; generation of arbitrary optical PM-QAM signals (higher order QAM, 16→32; 64; 100; 144); and optical Power budget for TX-OSNR which limits order of QAM. Further, optical output power density must remain constant compared to legacy systems for optical output power to be increased, ideally without use of optical amplifiers within the Silicon Photonics (SiP) modulator/waveguide structures (for example avoiding III-V or II-IV material systems in the SiP Silicon on Insulator SOI-CMOS portions (electrical and optical)). A further challenge is reasonable analog bandwidth of the digital-to-analog conversion, basically the digital signal processing (DSP)-to-optical e-field chain.

Figure 1:
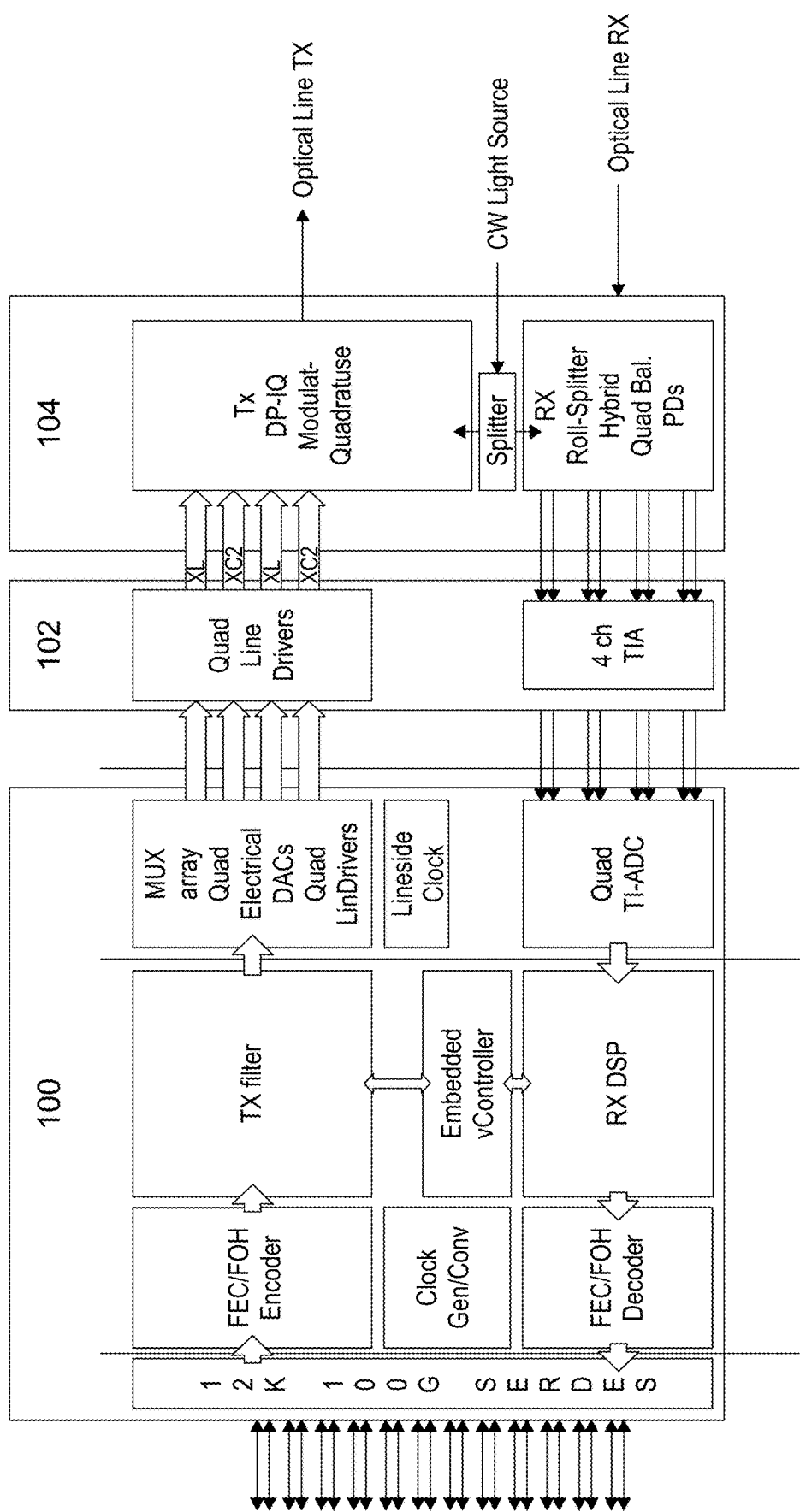
FIG. 1 shows functions of a coherent module split between two silicon-based chips.
Figure 2:
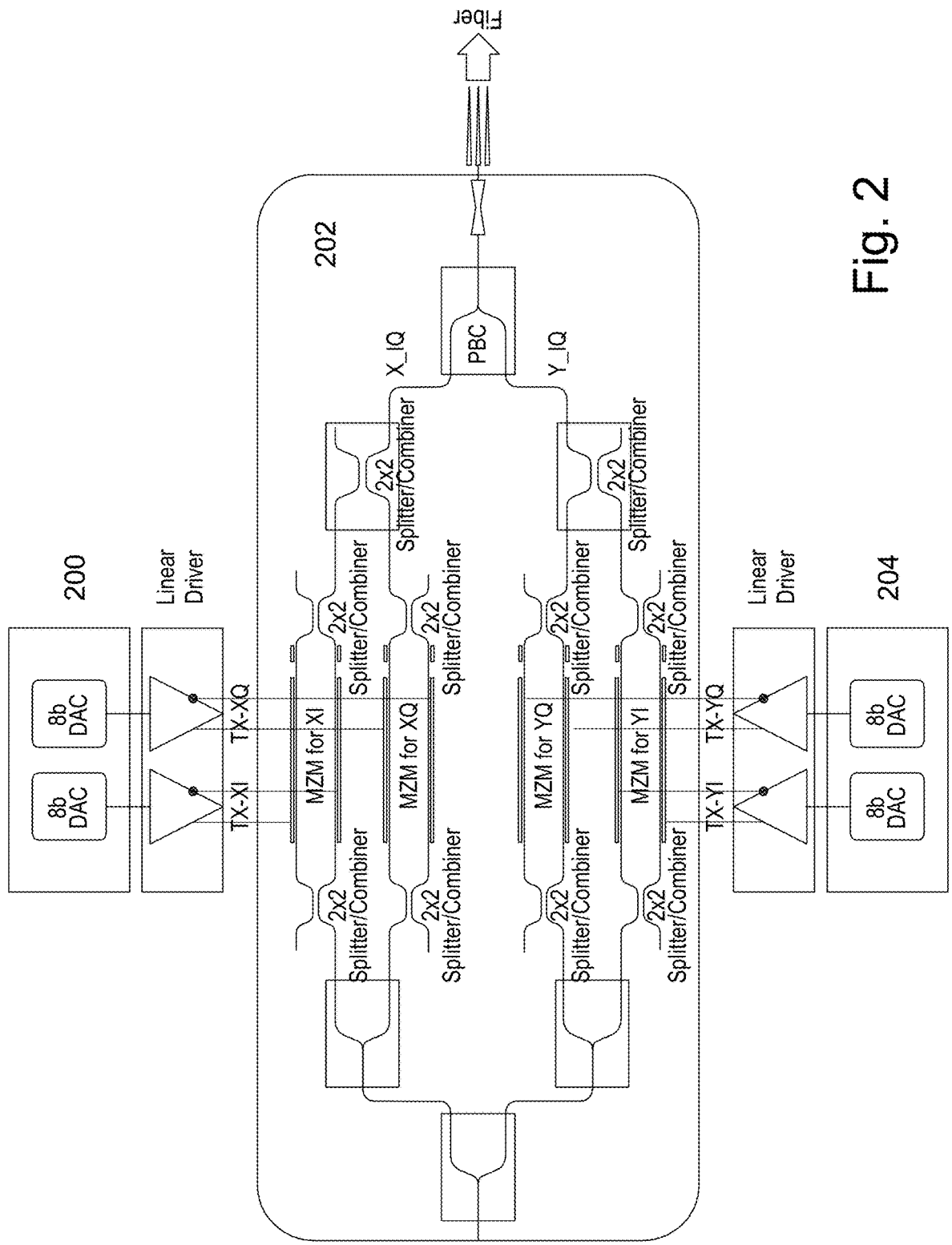
FIG. 2 shows a silicon photonics assembly scheme.

FIGS. 1 and 2 show how functions of a coherent module can be split between two silicon-based chips, with electrical DAC 100, linear driver 102, single segment Mach Zehnder Modulator (MZM) 104 on the TX side but relying on a silicon-based chip for electronics, Silicon Photonics for EO conversion and a wafer-scale chip-to-chip flip-chip assembly scheme as shown in FIG. 2. In this ACO (Analog Coherent Optics) type architecture the electrical silicon chip contains drivers 200, 204 and bias circuitry 202 close to the optics, the DSP being a chip outside the electro-optical subassembly 202.

Ideally, in DCO (Digital Coherent Optics), driver and TIA circuits are integrated parts of the DSP chip, leading to a 2 chip approach for the electro-optical subassembly including the digital processing functions and serializer deserializer (SERDES) blocks towards the host system. Such an arrangement uses multiple samples per symbol (oversampling factor typically 1.4 to 2) to enable Nyquist filtering/frequency shaping for longer reach applications. However, for DCI, a simplified approach with symbol-rate sampling (oversampling factor of 1) and appropriate high frequency design (to shape the frequency response) of the drivers is more appropriate.

Silicon Photonics technology based on accumulation mode Phase Shifters (for example semiconductor-insulatorsemiconductor capacitor (SisCap) modulators of the type known to the skilled person, for example as available from Cisco Technologies) is well suited to the limitations mentioned above. In addition to the temperature independence of relevant parameters (no temperature control for EO subassembly required), low voltage levels of Silicon Photonics (SiP) solutions in general and the ultimately small size of SisCap modulators allows application of waferscale assembly and CMOS technology-based semiconductor electronic and photonic devices. Hence, only light sources, CW sources (for example integrated tunable laser assembly (ITLA)) and connectors and, for dense wave division multiplexing (DWDM) and longer reach cases, optical amplifiers have to be added to the optical chain. However conventionally, usage of a multiplicity of technologies lacking scaling effects across the supply chain either sacrifices the low-cost target and/or basic performance criteria of TX-OSNR and analog BW.

A digital approach to overcome the bandwidth limitations of an electrical DAC+analog driver+modulator chain is to split the DAC function into a driver portion, implemented in the electrical chip, and an optical digital Amplitude Modulator, where the summation of weighted phase increments happens in the optical domain ("DACless"), which is essentially a 2b DAC function with adjustable levels. Alternatively, arbitrary constellation/shaping schemes can be adopted, for example for the CMOS/Silicon Photonics (SiP) combination with 1 sample per symbol. Pulse/frequency shaping capabilities are restricted, as mainly defined by the driver characteristics.

Alternatively, still an Optical DAC based on multiple electrodes could be adopted, where a set of digital rail-to-rail data drive a multi-segment MZM directly, thus converting binary or thermometer encoded data directly to the complex optical e-field. Such approaches are suited to SisCap technology, because the size of segments is in the 10 um range, the accumulated length of the segments being around 400 µm. In that case the electrical driver can be placed above the MZM segments using a chip-chip flip-chip interconnect. Total length of interconnect between active devices (transistors) of the driver and the SisCap plates is in the 80 µm range and below, so the structures can be treated as lumped elements for high frequencies approaching 70 GHz, and no termination or travelling wave electrodes are required.

However, such approaches face limitations from linearity requirements. Accordingly Look-Up-Table based digital-to-digital mapping is used to take the sine shaped transfer curve of MZM into account and convert the whole chain to a linear digital-to-e-field relationship. At the same time the level dependent absorption of a Silicon Photonics based modulator is compensated, as well as any other nonlinearity up to the quantization limits. This is achievable, because the conditions in this case allow the modulator to be treated as a memoryless system, the weighted summation of phase increments being governed by the THz-bandwidth of optics, and the compensation of nonlinearity being accomplished by using a quasi-static table. Hence the SisCap phase shifter can be run in overdrive mode without sacrificing linearity requirements (not possible for linear operating mode). Tweaking drive voltages to reasonably high values, this overcomes static and operational loss limits.

To achieve 1.5 Tbps gross rate per wavelength requires 2× baudrate (53 GBd to 106 GBd), double bandwidth at constant power density i.e. −6 dBm output power, which increases order of modulation from 16QAM to 144 QAM, which nearly doubles (4:7.17) the transmitted bits per symbol, and doubles BW efficiency accordingly. However, to achieve this, a known 1×CMOS die+1×PIC die, is limited in baudrate to around 70 GBd, as CMOS technology nodes are evolving in terms of density and minimum feature size, but not in terms of bitrate. AN approach overcome this limit is to shift functionality from the (BW limited) electrical domain to the nearly unlimited BW (THz range) optical domain.

OTDM is well known, but the practical implications make it difficult to implement it in products. Pulse Carver based Optical Transmitters have been used in RZ (Return-to-Zero) based transmission schemes to deal with chromatic dispersion (CD) in non-coherent applications. Rodney S. Tucker, Gadi Eisenstein, Steven K. Korotky, "Optical Time-Division Multiplexing for Very High Bit-Rate Transmission", IEEE J. Lightw. Technol., Vol. 6, No. 11, pp. 1737-1748, November 1988 describes an OTDM system, where the transmitter is based on two return-to-zero (RZ) transmitters with data of half the output rate fed with appropriate delay offset to a fiber-based 2×2 combiner. In the same paper, a voltage controlled steering mechanism in a Mach-Zehnder-Interferometer towards the two outputs of the combiner is described. However limited Extinction Ratio and size of Mach-Zehnder Modulators using analog driver schemes prevent application of true OTDM schemes for DCI. Additionally, power consumption and optical budget restrictions must be considered.

In another known approach, Hiroshi Yamazaki, Akihide Sano, Munehiko Nagatani, and Yutaka Miyamoto "Single-carrier 1-Tb/s PDM-16QAM transmission using high-speed InP MUX-DACs and an integrated OTDM modulator" OPTICS EXPRESS 12867 Vol. 23, No. 10 18 May 2015 describes single-wavelength 1-Tb/s pulse duration modulation PDM-16QAM transmission using high-speed InP MUX-DACs and an integrated OTDM modulator in a laboratory set-up. In this paper a quarter rate clock system with 90 degrees shifted contributors is used to generate two carrier signals, a special case of multi carrier signal, followed by two MZMs running at half symbol rate, using both constructive and destructive outputs of a 2×2 splitter/combiner to feed the two modulator chains. The 2×2 splitter/combiner generates two orthogonal carrier-suppressed return-to-zero (CSRZ) pulses.

In that case LiNb as basic technology for the MZI-modulator and InP based electrical MUX-DAC is used, which is not compliant to an intended low-cost, high yield wafer-scale production environment. LiNb MZM offers an extinction ratio sufficient for 16QAM, but not for higher order QAM modulation schemes.

Embodiments: Use of OTDM

According to approaches described herein, OTDM overcomes the operating frequency limitation by implementing a super-modulator structure which host, as optical modulator components, two individual transmitter chains such as optical digital analog converters (ODACs). The two transmitter chains are fed by time interleaved optical pulses which are generated inside the super-modulator structure by an OTDM generator in one of the transmitter chains, or in an OTDM upstream of the transmitter chains. As a result, a super modulator structure is provided hosting the transmitter chains, the tine interleaved optical pulses being generated inside the super modulator structure. This approach halves the bandwidth requirement of high-speed components to half per modulator for all high-speed broad-band electronic and electrical components carrying data. Embodiments are discussed with reference to SisCAp based Silicon Photonics technologies, but it will be appreciated that any other EO modulator may be adapted accordingly.

Figure 3:
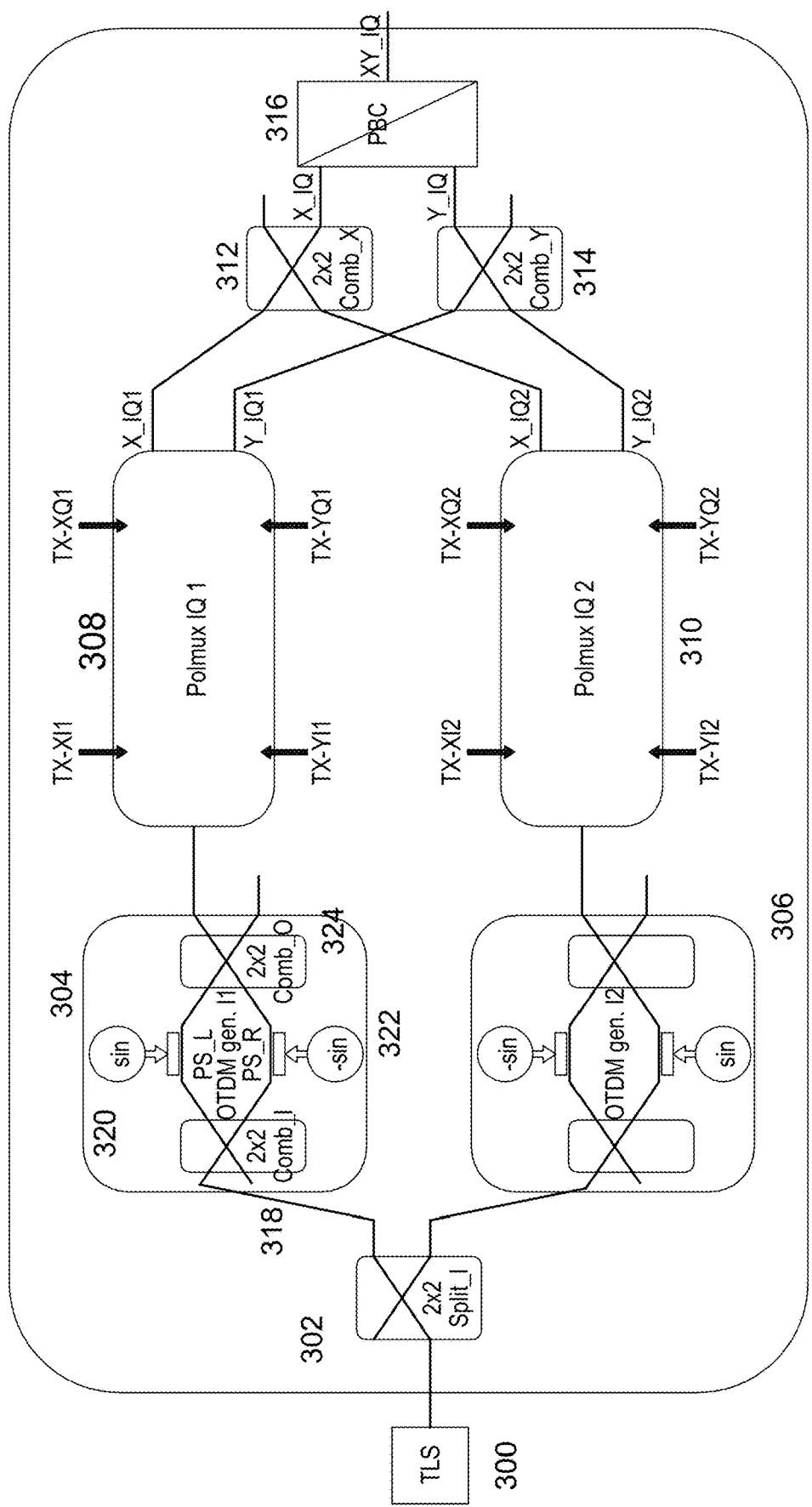
FIG. 3 shows a coherent optical transmitter structure.
Figure 4A:
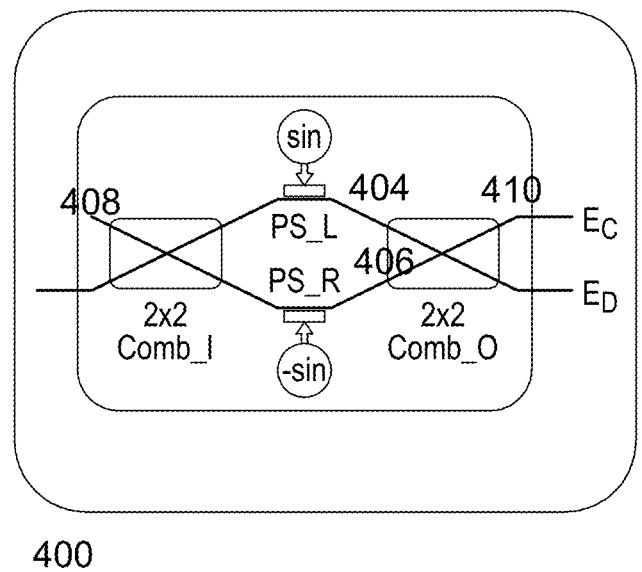
FIG. 4*a* shows an Mach Zehnder Modulator (MZM) operated at quadrature point.
Figure 4B:
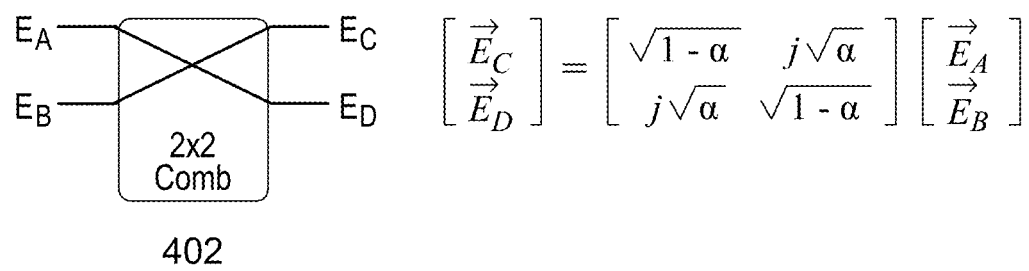
FIG. 4*b* shows Optical Time-Division Multiplexing (OTDM) splitter outputs.

FIGS. 3, 4a and 4b show a transmitter chain structure provided in coherent optical. A Transmit Light Source (TLS) 300 feeds CW light into a first 2×2 splitter/combiner 302 (of any appropriate type, for example a Y-splitter). The two splitter outputs are fed to OTDM generators 304, 306 which "chop" the CW light into pulsed streams 402 as shown in FIG. 4b, with transfer matrix:

$$\begin{bmatrix} \vec{E}_C \\ \vec{E}_D \end{bmatrix} = \begin{bmatrix} \sqrt{1-\alpha} & j\sqrt{\alpha} \\ j\sqrt{\alpha} & \sqrt{1-\alpha} \end{bmatrix} \begin{bmatrix} \vec{E}_A \\ \vec{E}_B \end{bmatrix}$$

Polmux_IQ modulators 308, 310 are described in more detail below, and are composed of 4 MZMs each, operated at half-rate data, for example using an ACO analog ODAC based approach, with drive electrical drive signals TX_I1, TX_Q1, TY_I1, TY_Q1 (for timeslot/phase 1) and TX_I2, TX_Q2, TY_I2, TY_Q2 (for timeslot/phase 2). OTDM generators 304, 306 and Polmux_IQ modulators 308, 310 in series form an RZ-modulator with 1/(baudrate/2) delay between the two.

The data carrying time slot signals X_IQ1 and X_IQ2 are combined in a 2×2 or Y-combiner (X_IQ) 312, as is done for Y_IQ1 and Y_IQ2 (Y_IQ), 314. A Polarizing Beam Combiner (PBC) 316 reassembles the PM-QAM Optical Transmit Signal XY_IQ.

The use of two distinct MZMs as OTDM generators (switches) make it easier to achieve a reasonably high extinction ratio to avoid crosstalk from one time slot to the other (phase 1, phase 2). In further improvements it is desired to achieve similar results using Silicon Photonics (SiP) technology as discussed in more detail below. In particular the OTDM_generators 304, 306 are Mach Zehnder Modulators consisting of an Input Splitter (2×2 Comb_I), 318, two phase sections (PS_L, PS_R) 320,322, and a 2×2 output combiner (2×2 Comb_O) 324. They are driven with sine- or trapezoid shaped single-tone signals with a frequency half the baudrate (sin and −sin). Typically, to achieve a pure AM modulation of the CW light from the laser source (TLS), the Mach-Zehnder-Interferometer based OTDM generators are driven by balanced clocks. Therefore, narrowband techniques can be applied to overcome power consumption and RF issues.

The OTDM_generators 304, 306 is operated at the quadrature point 400 and therefore acts as an On/Off switch or Amplitude modulator as shown at 400 in FIG. 4a. If operated with a swing close to $V_{pi}$ around quadrature operating point the 2×2 combiner in the output with feeding waveguides ($E_C$ and $E_D$) shows a soft compression shape, due to the sine shaped transfer curve of the Mach-Zehnder-Interferometer (this is a high extinction ratio case).

Depending on the drive levels a High Extinction Ratio or Low Extinction Ratio may be considered as discussed in more detail below.

The insertion loss adds up to (for Low ER case) 4.8 dB, and (for High ER case) 7.9 dB. It is desirable to further reduce the loss, which adds up to >8.2 dB for the OTDM contribution from splitters (excess loss 0.2 dB), OTDM generators (4.8 dB) and 2×2 combiner (3 dB structural loss+0.2 dB excess loss), when compared to the non-OTDM case as this can limit the TX-OSNR to a value too low for higher order modulation formats.

The loss is optimized for a given Silicon Photonics technology, by optimizing the length of the phase sections (PS_L, PS_R) and drive conditions. But this operating point leads to an extinction ratio (15 dB), which leaves a crosstalk between time slots (OTDM generator leakage) sacrificing TX-OSNR. Accordingly, it is desirable to further improve the extinction ratio of the OTDM generator, to allow higher order modulation formats. For example, for 144QAM (equivalent to 12 PAM (pulse amplitude modulation) for single tributary) an extinction ratio of 40 dB is desirable. Extinction Ratio degradation is caused by crosstalk into the quadrature channel due to voltage dependent attenuation/phase shift in the OTDM generator and non-ideal 50:50 splitting ratio of splitter/combiners due to process variations in high volume production.

Figure 5:
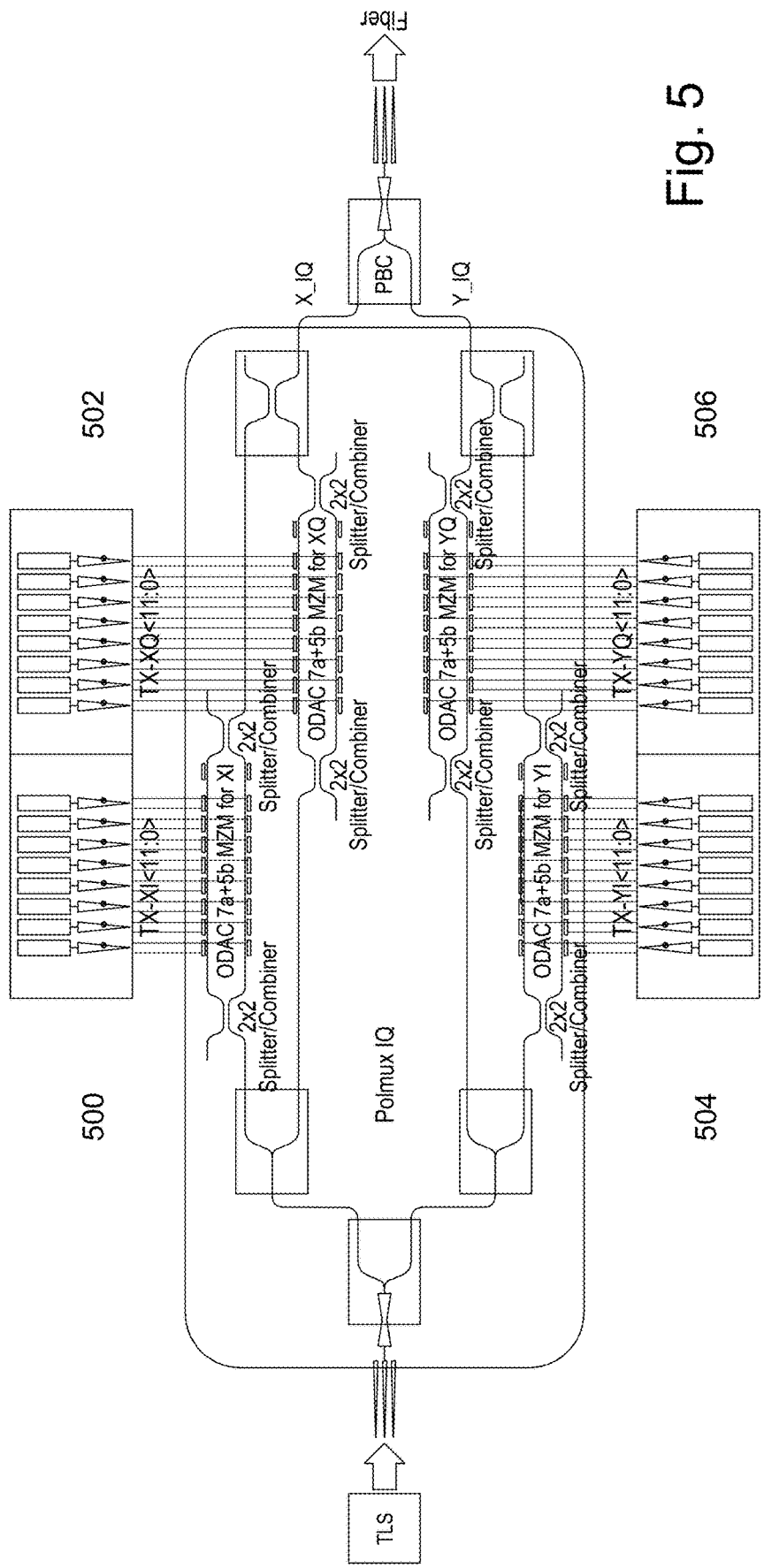
FIG. 5 shows a modulator architecture.

There will now be described OTDM embodiments in which a digitally enhanced extinction ratio is achieved in an MZI/MZM improving performance of the architecture yet further either by structural or adaptive electronic means. As background, FIG. 5 shows in more detail an architecture for the "Polmux IQ" modulators 308, 310 for up to 64 GBd, optimized for the present embodiments. Four instances of segmented MZMs are provided 500, 502, 504, 506, each composed of 7 unary weighted (equal size) and 5 binary weighted phase shifter segments. The Unary weighted segments block is driven by thermometer encoded data. Electrical drivers are rail-to-rail limiting inverter type buffers. This architecture can be used as a 64QAM dual tributary "DACless" modulator, or as an arbitrary optical DAC with 8b resolution up to an analog BW approaching symbolrate/2. Adding a Polarizing Beam Combiner (PBC) on the SiP chip gives a full PM-arbitraryQAM transmitter.

Figure 6:
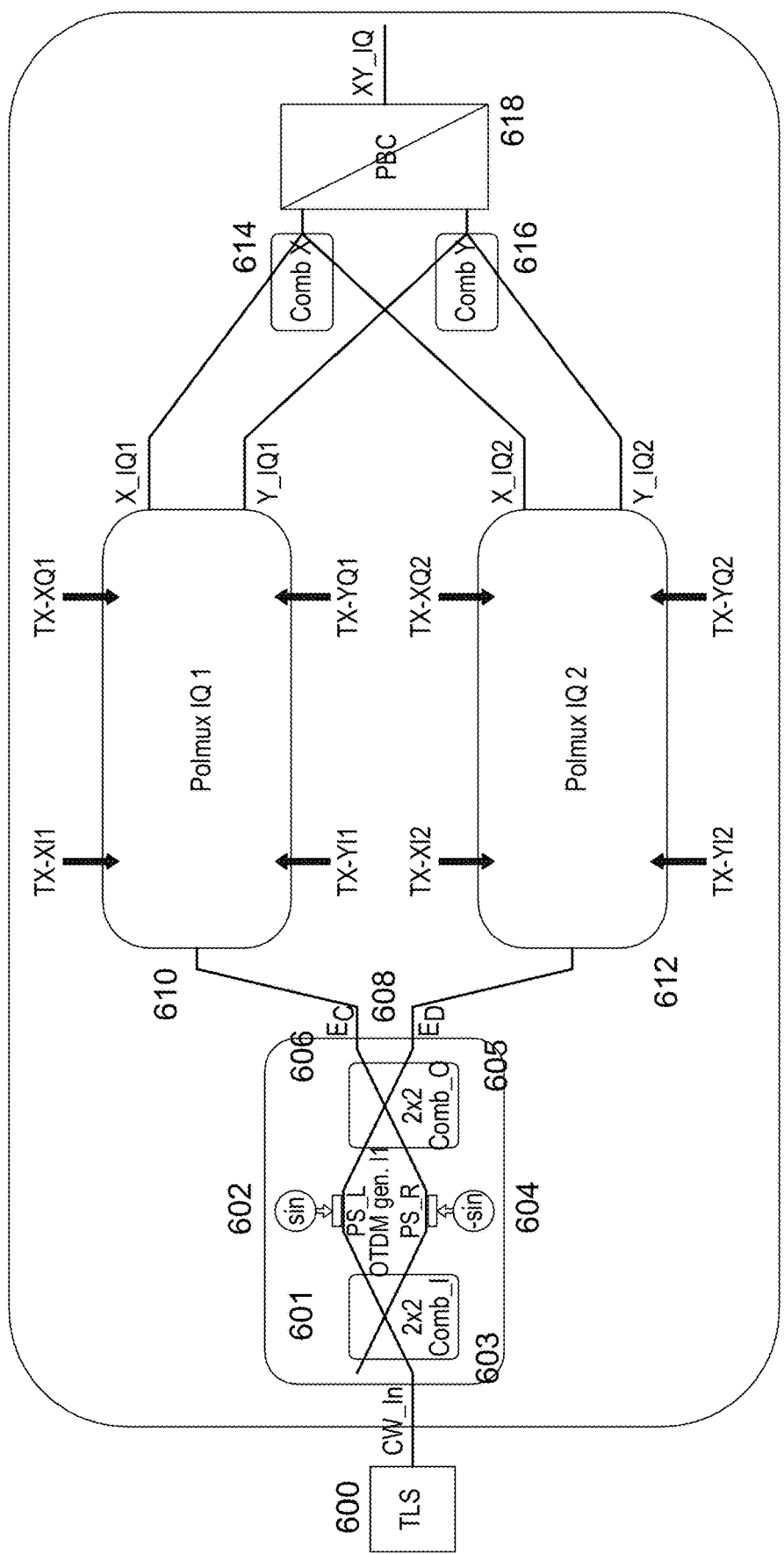
FIG. 6 shows a 2×2 combiner of an OTDM generator.

FIG. 6 shows an architecture-based approach to avoid 3 dB of insertion loss when compared to the arrangement of FIG. 3. A Transmit Light Source (TLS) 600 feeds CW light directly into 2×2 Combiner Comb_I 603 of an OTDM generator 601, which "chops" the CW light by the balanced drive signals 602, 604 (sin, −sin) into pulsed streams and at the same time steers the CW beam through 2×2 combiner 605 Comb_Q into constructive and destructive outputs $E_C$ 606 and $E_D$ 608, effectively generating an interleaved optical "clock". The steering mechanism applied hence ensures that the pulse streams are interleaved with 1/baudrate. As discussed above with respect to FIG. 4a, the MZM is operated at the quadrature point and therefore acts as an On/Off switch or Amplitude modulator.

Polmux_IQ modulators 610, 612 forming the transmitter chain are composed of 4 MZMs each, operated at half-rate data, implemented in the manner described above, for example an ACO analog or ODAC based approach, with respective drive electrical drive signals TX_I1, TX_Q1, TY_I1, TY_Q1 (for timeslot/phase 1) and TX_I2, TX_Q2, TY_I2, TY_Q2 (for timeslot/phase 2). The data carrying time slot signals X_IQ1 and X_IQ2 are combined in a 2×2 or Y-combiner (X_IQ) 614, and Y_IQ1 and Y_IQ2 are combined in a 2×2 or Y-combiner (Y_IQ) 616. A Polarizing Beam Combiner (PBC) 618 outputs a PM-QAM Optical Transmit Signal XY_IQ.

Compared with arrangement of FIG. 3, it is found that the OTDM contribution to the loss is reduced by 3 dB, with low ER. Further, the Polmux_IQ data modulators 610, 612 can be operated below their maximum capabilities in terms of baudrate, which allows use of higher voltages to reduce phase shifter length. In the case of the ODAC approach (with reference to FIG. 5) they can be operated at high drive levels (voltage across SisCap plates for modulation depth 0.8) well in the nonlinear region. The linearity is given by the summation of phase contributions of the segments and 1D table-based compensation to cover the sine shaped transfer function of the MZM. In that case for the SisCap technology 3 dB static and 7 dB operational loss for 144QAM have been simulated and used as basic performance numbers.

Figure 7:
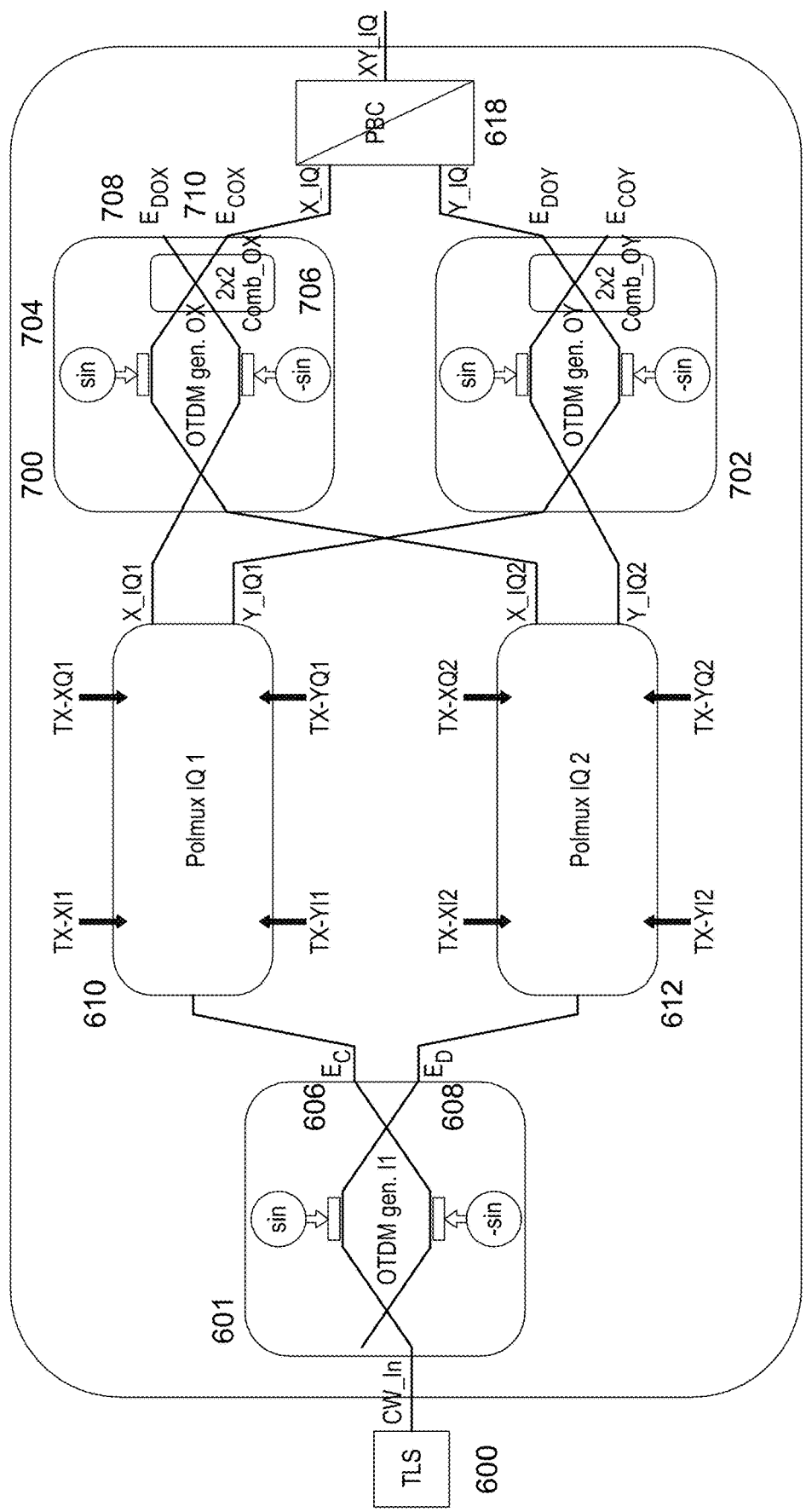
FIG. 7 shows OTDM generators for reducing crosstalk.

In order to achieve yet further improvements to the extinction ratio for a single OTDM generator (switch) FIG. 7 shows an arrangement to reduce crosstalk from one time slot to the other, where like reference numerals represent like components as in FIG. 6. Here, combiners Comb_X 614 and Comb_Y 616 are replaced prior to the PBC 618 by a second level of OTDM generators 700, 702, downstream of modulators 610, 612 and of the type described above, on the output side. As for the arrangement of FIG. 6, the CW_In light from TLS 600 is chopped by OTDM_gen.I1 601, where both the constructive and destructive interference outputs $E_C$ 606 and $E_D$ 608 are used.

Respective outputs X_IQ1 and X_IQ2 from the Polmux modulators 610, 612 are fed to OTDM generator 700 which steers, controlled by drive signals 704, 706 (sin, −sin) the pulsed/RZ-shaped data stream in the phase 1 time-slot from X_IQ1 to the constructive output $E_{COX}$ 710 of OTDM generator 700. In phase 1, the X_IQ2, which in phase 1 is on the 0-power level originating from the input OTDM generator, is steered to the destructive output $E_{DOX}$—708 so no power is lost. In Phase 2 timeslot, X_IQ2, carrying RZ data to that point in time, is steered to the constructive output $E_{COX}$ 710 and therefore passed to the PBC 618, but the zero of _XIQ1 is steered to the unused destructive output $E_D$ 708, again avoiding power loss. Outputs Y_IQ2 and Y_IQ2 (for time slot 2) are processed by OTDM_gen.O2 702 in the same way and passed to the Y input of the PBC 618 which merges to the PM-QAM Optical Transmit Signal XY_IQ.

As a result, the 3 dB structural loss of a passive 2×2 combiner at the output of the respective OTDM_gen.OX. 700, 702 is avoided and the extinction ratio achieved overall (which is achieved, if drive signals (sin, −sin) are the same and delay between OTDM_gen.I1/OTDM_gen.OX/Y is optimized for maximum transfer), is increased by a factor of 2. This can be used, for example, for modulation schemes for which 30 dB ER is sufficient, for example 16QAM/128 GBd for 800 Gbps net rate. In that case the arrangement of FIG. 7 can allow implementation with legacy TX DSP algorithms.

Figure 8:
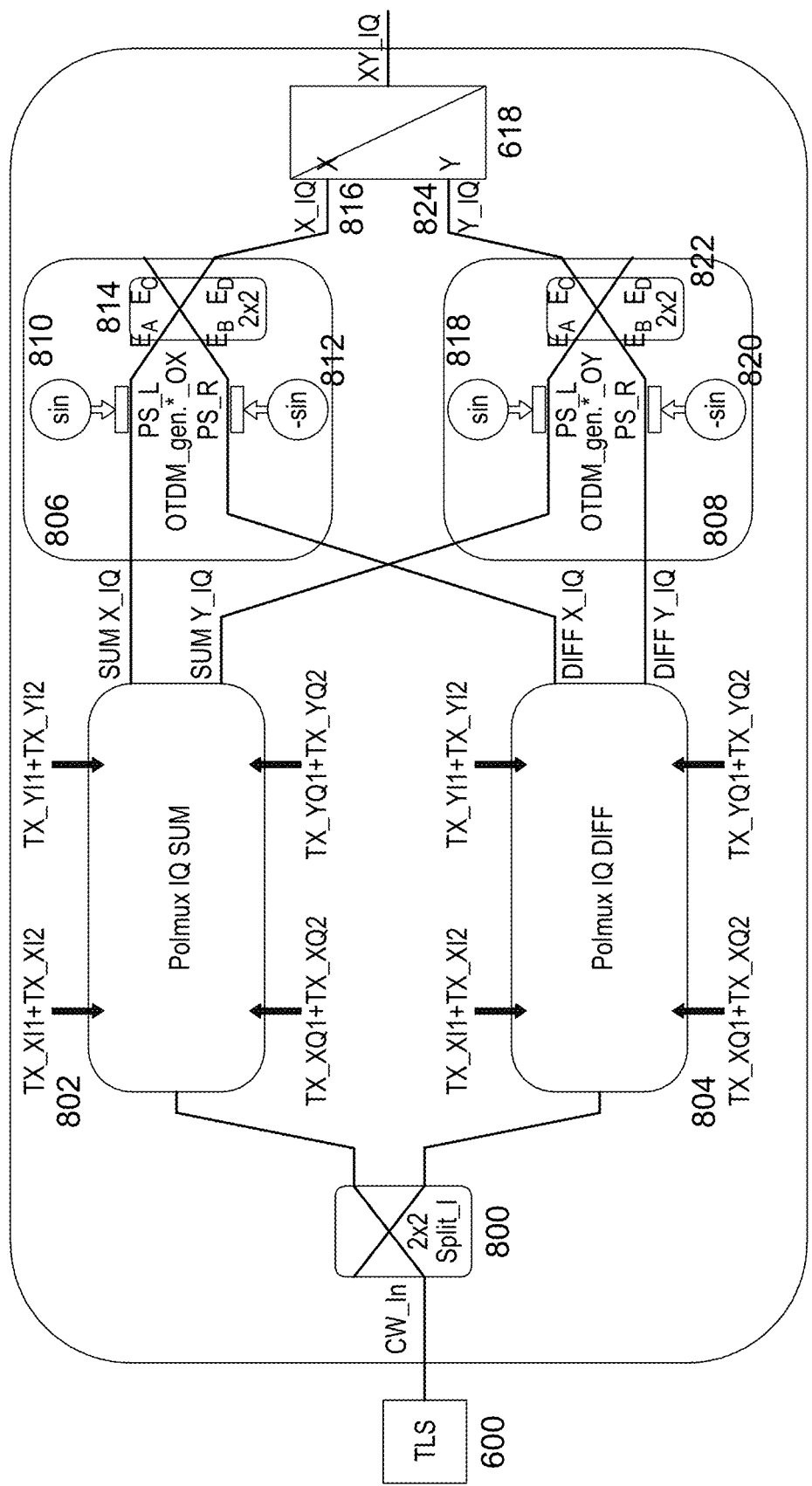
FIG. 8 shows a configuration of OTDM generators for reduced power consumption.

In a further embodiment, described with respect to FIG. 8, where like reference numerals depict like components, a reduced number of OTDM generators can be used, reducing the power consumption to drive them by moving the OTDM generator function to the output side. CW light from TLS 600 is split at 2×2 splitter Split_I 800 and fed into two IQ modulators Polmux_IQ_SUM 802 and Polmux_IQ_Diff, 804 respectively. The Polmux IQ modulators 802, 804 can again be of known type, for example ACO or ODAC as discussed above, comprising 4 MZMs operated at the zero-transmission operating point.

The drive data SUM are (TX_XI1+TX_XI2), (TX_XQ1+TX_XQ2) for the X-polarization, and (TX_YI1+TX_YI2), (TX_YQ1+TX_YQ2) for the Y-polarization channel in Polmux_IQ_SUM 802. Accordingly, the DIFF drive data are (TX_XI1-TX_XI2), (TX_XQ1-TX_XQ2) for the X-polarization (TX_YI1-TX_YI2), (TX_YQ1-TX_YQ2) for the Y-polarization channel in Polmux_IQ_Diff 804. SUM and DIFF are processed in the DSP prior to multiplexing to the electrical driver chains. The effective modulation depth for the main signal is reduced to 0.5 because the dynamic range of the DACs has to cover SUMs and DIFFs (in the digital domain, 1b more resolution), but the higher operational loss in MZM due to reduced modulation factor (+/−0.4 of 2 Vpi)

(−180 deg to +180 deg phase shift)) is regained in the combiner (factor 2 in eq. 1, 2, 3, 4), as shown below.

The OTDM generators 806, 808 downstream of the modulators 802, 804 receive the SUM and DIFF outputs for respective Polarization (X, Y); the input splitter is omitted/ not required. To prepare the X polarization the SUM_X_IQ and DIFF_X_IQ are fed to OTDM_gen.*_OX 806. This OTDM generator is driven by clock signals (sin, −sin) 810, 812 in a balanced fashion. In phase 1 operation the Sum of Sum_XQ and Diff_X_IQ is transferred by 2×2 combiner Comb_OX 814 to the constructive interference output 816 X_IQ (summation of vectors). As can be seen in eq.1 below, in this phase 1, the part dedicated to phase 2 is cancelled out, and 2*(XI1+jXQ1) is transferred in this timeslot to the PBC 618. In phase 2 operation the difference of Sum_XQ and Diff_X_IQ is transferred to the constructive interference output 816 X_IQ (difference of vectors). As can be seen in eq.2, in phase 2, the part dedicated to phase 1 is cancelled out, and 2*(XI2+jQ2) is transferred in this timeslot to the X-input of PBC 618.

To prepare the Y-polarization, the SUM_Y_IQ and DIFF_Y_IQ are fed to OTDM_generator 808 gen.*_OY. This OTDM generator is driven by clock signals 818, 820 (sin, −sin) in a balanced fashion. In phase 1 operation the difference of Sum_Y_IQ and Diff_Y_IQ is transferred by 2×2 combiner Comb_OX 822 to the constructive interference output Y_IQ 824. As can be seen in eq.3, in this phase 1, the part dedicated to phase 2 is cancelled out, and 2*(YI1+jYQ1) is transferred in this timeslot to the PBC 618. In phase 2 operation the difference of Sum_YQ and Diff_Y_IQ is transferred to the constructive interference output $E_C$→Y_IQ 824. As can be seen in eq.4, in this phase 2, the part dedicated to phase 1 is cancelled out, and 2*(YI2+jYQ2) is transferred in this timeslot to the Y-input of PBC 618. Once again, the division by 2 in the summation on the DSP side is compensated by the multiplication with factor 2 in the optical domain. The Polarizing Beam Combiner (PBC) 618 merges to the PM-QAM Optical Transmit Signal XY_IQ.

phase 1:

$$X\_IQ = SUM\ X\_IQ + DIFF\ X\_IQ \quad \text{eq (1)}$$
$$= ((XI1 + jXQ1) + (XI2 + jXQ2)) +$$
$$((XI1 + jXQ1) - ((XI2 + jXQ2))$$
$$= 2^*(XI1 + jXQ1)$$

$$Y\_IQ = SUM\ Y\_IQ + DIFF\ Y\_IQ \quad \text{eq (2)}$$
$$= ((YI1 + jYQ1) + (YI2 + jYQ2)) +$$
$$((YI1 + jYQ1) - (YI2 + jYQ2))$$
$$= 2^*(YI1 + jYQ1)$$

phase 2:

$$X\_IQ = SUM\ X\_IQ - DIFF\ X\_IQ \quad \text{eq (3)}$$
$$= ((XI1 + jXQ1) + (XI2 + jXQ2)) -$$
$$((XI1 + jXQ1) - ((XI2 + jXQ2))$$
$$= 2^*(XI2 + jXQ2)$$

$$Y\_IQ = SUM\ Y\_IQ - DIFF\ Y - IQ \quad \text{eq (4)}$$
$$= ((YI1 + jYQ1) + (YI2 + jYQ2)) -$$

-continued $$((YI1 + jYQ1) - (YI2 + jYQ2))$$
$$= 2^*(YI2 + jYQ2)$$

When compared to the arrangement of FIG. 6, there is 0.2 dB improvement, because the OTDM_gen.* 806, 808 omits the splitter at the input, which typically adds 1× excess loss, so only electrode loss+3 dB (structural)+combiner excess loss add up. The sum and difference processing in the electronics is done synchronously and with high precision, beneficial for use with the ODAC approach. Hence any loss of the OTDM circuitry can be more than compensated by the proposed architectural structures, and appropriate drive and structure of the data modulators. In some instances, the ODAC approach leads to the required loss numbers. But the structures may also be applied to ACO type approaches, in the context of other photonic technologies.

Figure 9A:
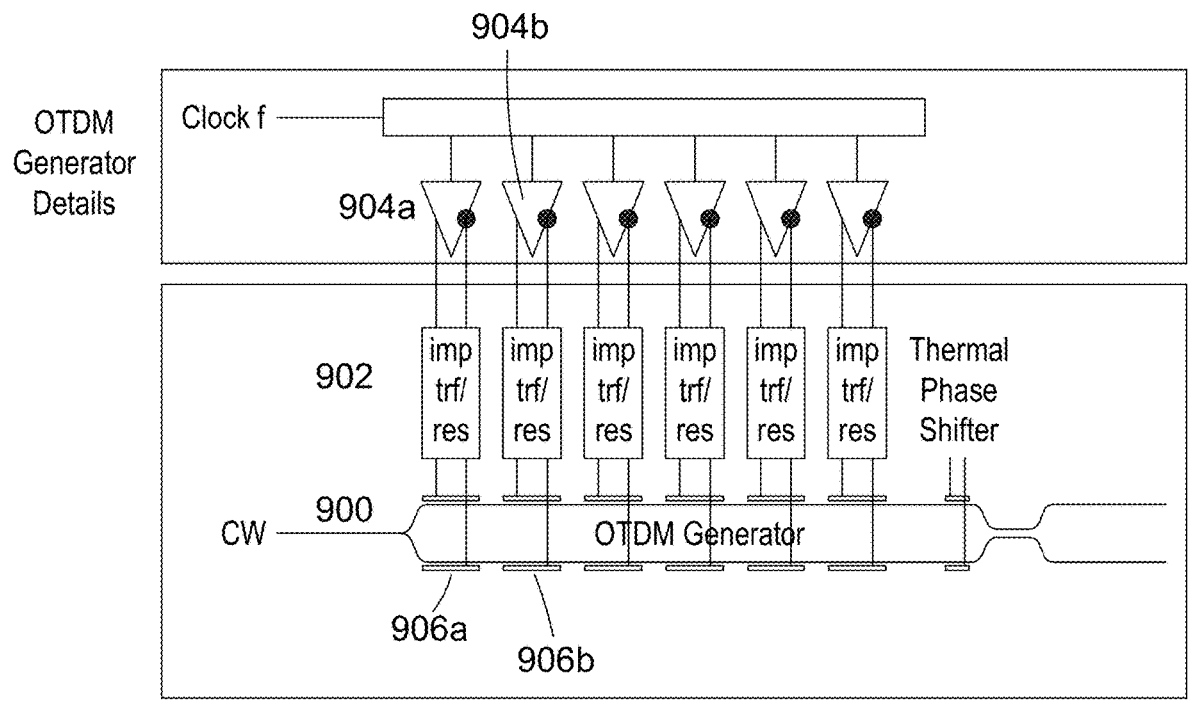
FIGS. 9*a* and 9*b* show a segmented MZM.
Figure 9B:
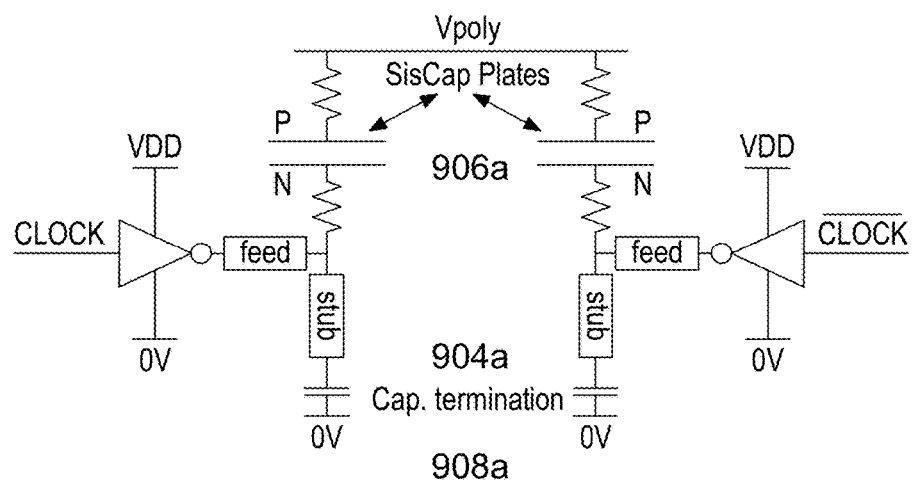

Turning in more detail to the OTDM generator or "pulse carver" it is preferred to limit power consumption and maximize drive levels as much as appropriate. As the OTDM generator is driven with single-tone, sinewave shaped clock, narrowband/RF techniques can be applied. This is accomplished by using a resonant interconnect structure to recover power, transform impedance and drive levels on the plates of the modulator as shown in FIGS. 9*a* and 9*b* which show a MZM 900, transmission line transformer/resonator. As also shown in FIG. 4*a*, which shows use of 2×2 combiners 408, 410, the OTDM driver on the electrical chip as well as the phase shifter of the MZM 404, 406 (PS_L, PS_R) are split into segments 906*a*, 906*b* . . . . Each segment is driven with a tuned transformer circuit 902. Drivers are fed with shifted clocks 904*a*, 904*b* . . . of frequency (baudrate/2), and preferably implemented using tapped delay lines to compensate TOF (time of flight) delay on the optical side in the doped waveguides or phase shifter section. Rail-to-rail buffers to drive segments can be used in some embodiments.

The total length of the MZM 900 phase shifters is determined by extinction ratio and loss, segmentation by appropriate values of transmission lines length and characteristic impedance and segment capacitance. Reasonable segmentation schemes for the MZM 900 are typically 3 to 6 segments 906*a*, 906*b* . . . ranging from 25 µm (micrometer) to 80 µm each.

Referring to FIG. 9*b*, the interconnect structure on the electrical chip is composed of the shortest possible flip-chip connect between electrical driver and SiP-chip. On the optical chip, a feeder transmission line is used to transform the capacitive load of the SisCap segment 906*a* to a real valued input impedance of 25 Ohms on the driver side and to the same time to increase the effective drive level on the SisCap plates. Parallel to the SisCap segment 906*a* a transmission line resonator/stub is tuned to the operating frequency of baudrate/2. As a short-circuit on the end, the stub termination may be an AC termination, implemented using a capacitor 908*a* connected to GND. AC coupling is applicable due to the nature of a single tone, but not mandatory. Thermal phase shifters for adjustment may be added to the phase sections for control of the orthogonal bias operating point. Usage of resonator/transmission line transformers per modulator segment/port permits each segment, together with passive components to act as a two-stage resonator (e.g. 48 . . . 70 GHz). The feeder transmission line may be implemented as a slowwave transmission line and the AC terminated stub may be implemented as a slowwave transmission line. As discussed above, the system is tuned together with driver impedance and modulator segment capacitance for a maximum peak at baudrate/2; transmission line loss and serial resistance in the modulator segment causes a flat peak in the frequency response of the resonator, thus covering a reasonably wide window for various applications (e.g. 48 GHz/96 GBd . . . 53 GHz/106 GBd). In an example, values for a low-ER case are 3 segments, 50 µm each, and for high-ER 6 segments, 80 µm each, accepting higher loss.

As discussed above, the overall extinction ratio, or crosstalk between timeslots is preferably improved in embodiments. As a result, it is possible to operate/design the OTDM generator(s) with dimensions/settings with less extinction ratio (e.g. 15 dB) and related lower Insertion loss. This permits use of the ER enhancement with higher, but still achievable performance as described below with reference to FIG. 10 which shows a coherent transponder with extinction ratio enhancement, architecture and assignment to electrical/optical functions. In this embodiment, interference cancelling of the type described in for example "Advances in Digital Signal Processing: Adaptive Filter Theory and Applications, chapter 4" City University Hong Kong, can be used where a signal s+n is corrected by subtracting a compensation signal y. The signal y comes from a processor which uses the aggressor signal n' to generate the compensation signal. If y=n, the aggressor is cancelled and on the output signal s is present without interference.

Interference cancelling/echo compensation has not previously been used in a coherent transmitter architecture such as OTDM. In the case of inter-timeslot crosstalk compensation in a transmitter, the data from which the crosstalk is originating are available in the transmitter itself, a similar situation as in echo cancellation applications. Nevertheless, for the case of inter-timeslot crosstalk compensation of OTDM, or extinction ratio enhancement in a coherent transmitter there are some specific items which favorably can be used to implement basic noise cancelling methods.

Figure 10:
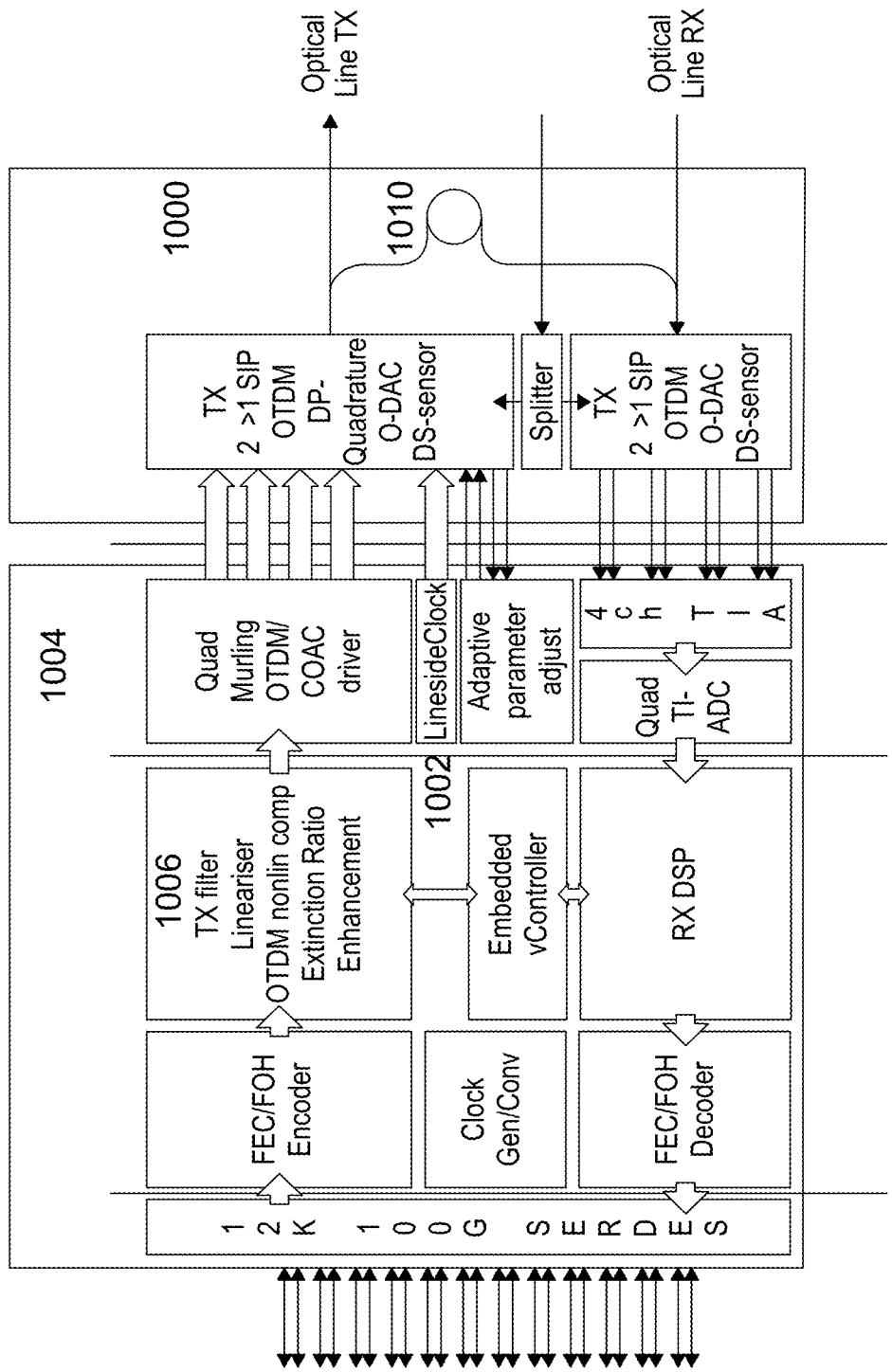
FIG. 10 shows a coherent transponder with extinction ratio enhancement.

FIG. 10 shows at a broad level a transponder incorporating an OTDM based transmitter for coherent optical transmission and circuitry to remove and control the OTDM related inter-timeslot crosstalk, for example 1.2 Tbps (net) PM-144QAM. Compared to the arrangement of FIG. 1, the structure is extended by an OTDM scheme with OTDM generators and the OTDM clock associated with it comprising a lineside clock 1002 towards the optical chip 1000. In the DSP block 1004, an extinction ratio enhancement block 1006 is added. A digital signal DS sensor (ADC function) converts and downsamples the output signal and passes that to the DSP block 1004 (directly or via the embedded controller block, where it might be preprocessed). On the optical chip 1000, there is an optional variable optical attenuator (VOA) or optical ring resonator (discussed in more detail below), acting as near end loop switch to loop, controlled by the embedded controller, to transmit data to the coherent receiver.

Figure 11:
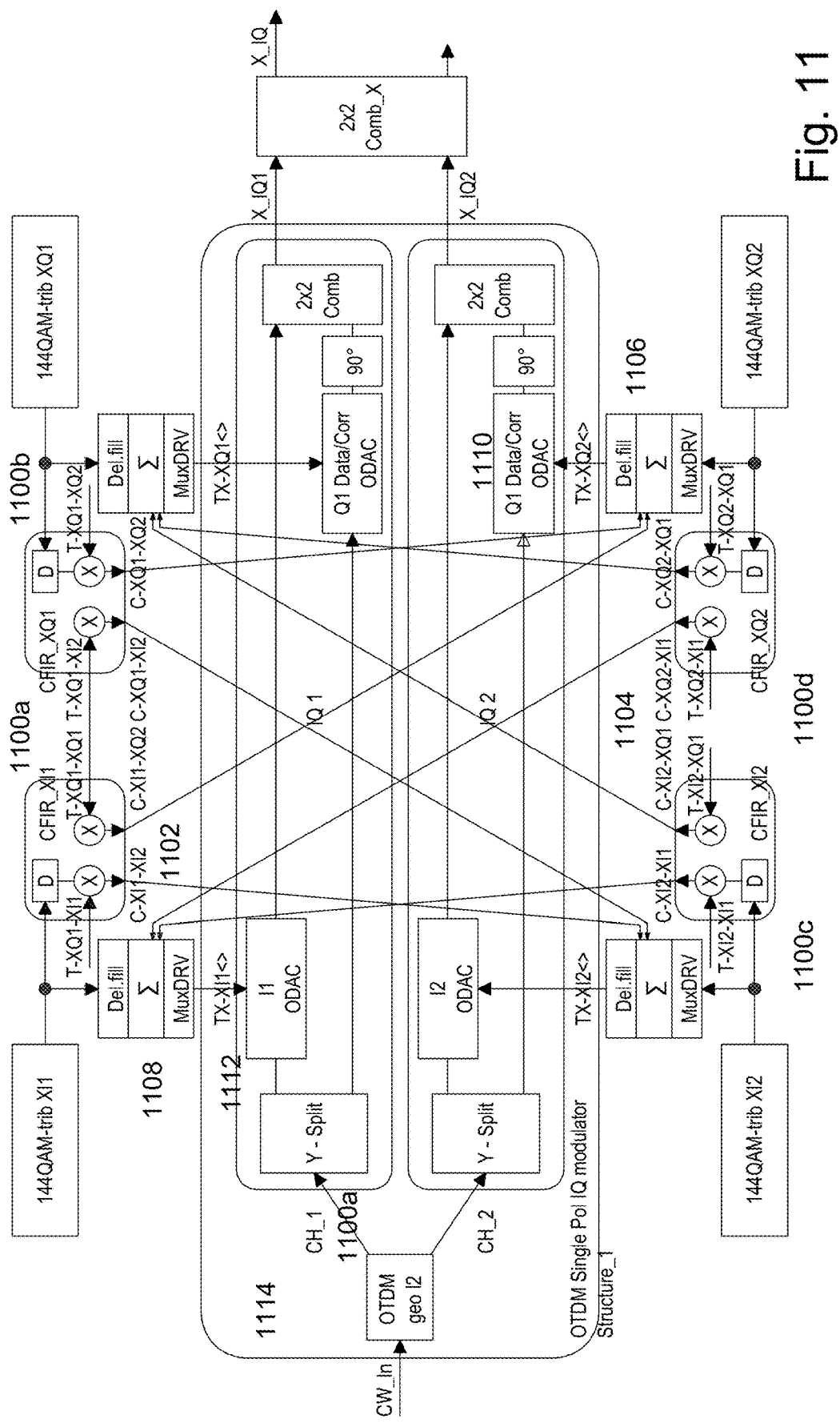
FIG. 11 shows an OTDM transmitter architecture.

FIG. 11 shows in more detail an OTDM Transmitter architecture operable to counteract inter-timeslot crosstalk with basic circuitry and filter structure, without tracking and relying on calibration, in this case for a single polarization, in an ODAC PM-144QAM configuration. For purposes of ease of description FIG. 11 shows X-polarization only. It can be extended to polarization multiplexed signals following the approaches set out above with reference to any of FIGS. 3 to 8; the optical part on the SiP chip being the same as for FIG. 6, preferably based on the ODAC approach. For full Polmux functionality, Polarization X and Y are not affected by OTDM operation as polarization rotation happens in the Polarizing Beam Combiner at the output after the OTDM combiner function (shown as 618 in FIG. 6). In the Polmux-IQ blocks (as shown in FIGS. 2 and 5), the parts dedicated to one polarization do not interfere with the other, they just share the input splitter.

In more detail, on the electrical chip, correction signals are generated by tapped delay line FIR (Finite Impulse Response) filters 1100a, b, c, d per tributary: CFIR_xx (Crosstalk Compensation Finite Impulse Filter) with filter tap weightings T-xx-xx, with equivalent delay D symbol-spaced and subtracted from the "victim" tributary/time-slot (the "aggressor" being the other timeslot). Correction signals are generated using complex weighting T=Ti-+jTq, 2 tap weightings per victim; (this may be extended to 3 taps per victim, in that case I-Q leakage within the generation of the IQ constellation may be controlled/optimized which can in some embodiments improve/replace pilot-tone based bias control of coherent transmitters). The impulse response of crosstalk due to limited ER to be compensated is short, so one complex tap per CFIR_xx is sufficient (affecting only the next timeslot); no memory effects or spreading out to more than the neighbor timeslot need be considered. Generally, the number of filter taps is arbitrary and might be enlarged as appropriate. As crosstalk is for >15 dB ER is well below main signal, processing can be low resolution (while averaging over time). The tap weightings T-xx-xx for Variant_a are factory calibrated and stored in a non-volatile memory.

For example, for signal TX-XI1 at filter 1100a, the signal is generated by a convolution of data D-XI1 with an impulse response as required by the system and delayed in the transmit filters. The crosstalk in optical output X-IQ1 originates from D-XI2 and D-XQ2. Therefore, these two data streams are convolved with the impulse response of the aggressor channel in CFIR_XI1 filter with tap weightings T-XI2-XI1 and T-XQ2-XI1. In the simple case shown there is just one multiplication per tributary; in the general case convolution is performed with a tap vector and additional delay instances. The compensation signals C-XI2-XI1 1102 and C-XQ2-XI1 1104 are subtracted in the DSP from the main data and passed after respective multiplexing/drivers 1106, 1108 to TX-XI1 input/TX-XQ2 input 1110, 1112 to ODAC I as part of the OTDM PM-xQAM modulator 1114. The other tributaries TX-XQ1, TX-XI2, TX-XQ2, TX-Yi1, TX-YQ1, TX-YI2, TX-YQ2, are processed accordingly.

Figure 12:
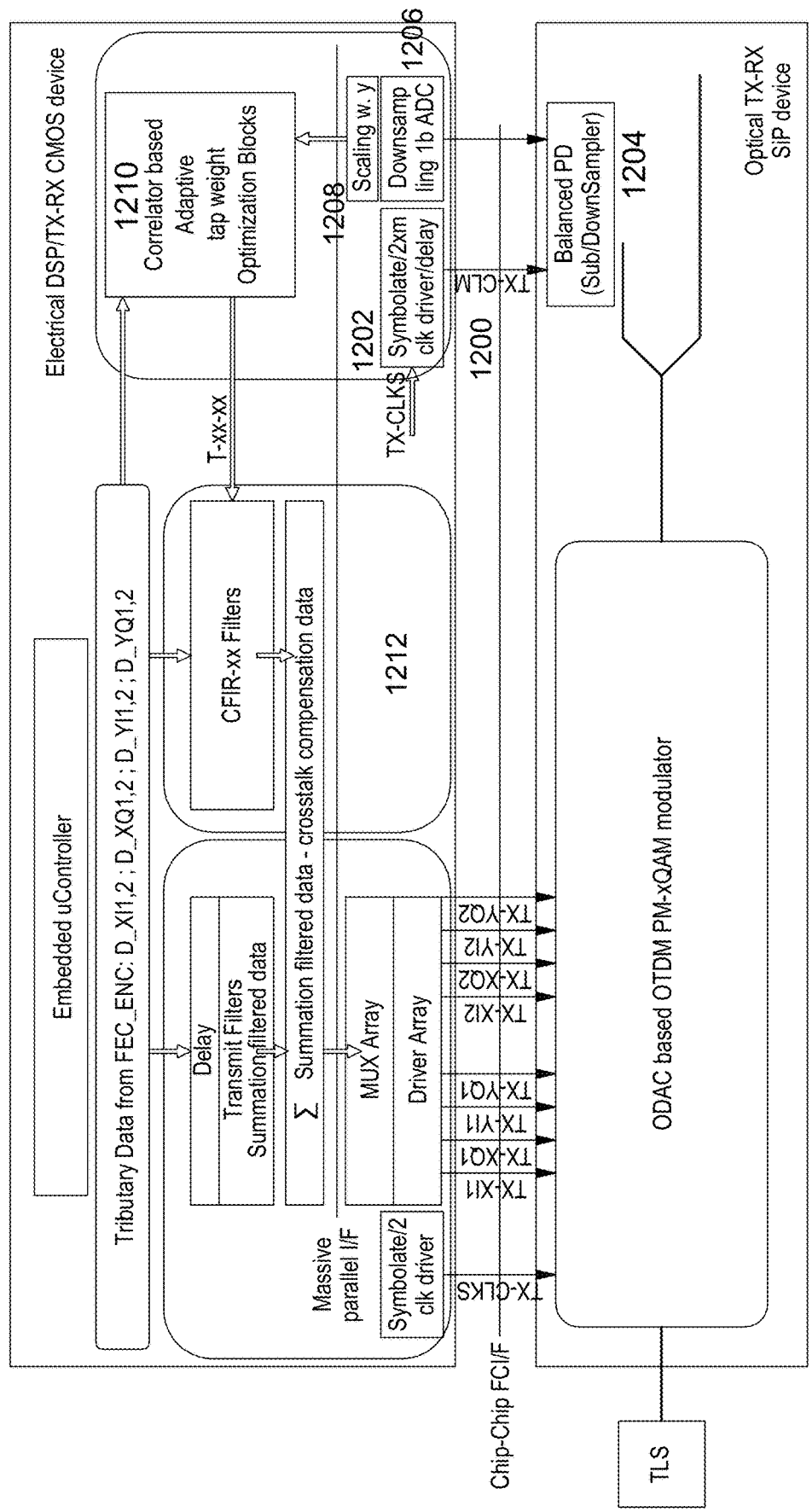
FIG. 12 shows an OTDM architecture with closed optimization loop.

In a further variant approach the embodiment of FIG. 11 is extended by an adaptive closed loop for filter parameters; an appropriate algorithm and OTDM PM-144QAM transmitter architecture for adaptive inter-timeslot crosstalk compensation is used to compute the parameters of an adaptive filter, downsampling ADC in the transmitter part. In particular, as shown in FIG. 12 the architecture is extended by a closed optimization loop 1200 for adaptive tracking of filter parameters. The same mechanism can also adjust Child MZI operating points, DC BIAS ABC (Automatic Bias Control); I/Q imbalance of parent modulators, DC BIAS ABC; and X/Y imbalance.

To implement the closed loop, a small part of the TX signal is split to via a 2×2 splitter/combiner 1202 to a balanced PhotoDiode (PD) 1204. This could be done directly (power sensor) or, together with a small part of the CW light, as a coherent signal with identical wavelength/frequency as the TX (homodyne, that is, same local CW source). A fixed rate downsampling ADC 1206 (downsampling ratio preferably in the region of 16 to 1024) converts the PD current to an A-to-D converter; preferably this ADC function is 1 bit (sign algorithm). The sampling clock TX-CLM is derived from TX-CLKS by division and arbitrary delay (for example controlled by embedded controller). The downsampler function can either apply optical sampling and 1b ADC function based on windowed integration and conversion or electrical sampling and 1b A/D conversion. The output of the downsampling ADC 1206 is scaled with a factor w,y at scaling block 1208 and passed to a correlator-based tap weight optimization block 1210. In this block, one at-a-time, the filter coefficients for different contributions for the crosstalk compensation are optimized. A basic approach for adaptive control of tap weights comprises cross-correlation of sent data (available in TX) with sampled error with the criteria of mean least magnitude error minimization. The optimized filter taps for T_xx_xx are passed to the CFIR_xx filters 1212, which are equivalent to the ones described with respect to FIG. 11 such that TX-XI1 is generated by a convolution of data D-XI1 with an impulse response as required by the system and delayed in the transmit filters. The crosstalk in optical output X-IQ1 originates from D-XI2 and D-XQ2. Therefore, these two data streams are convolved with the impulse response of the aggressor channel in CFIR_XI1 filter with tap weightings T-XI2-XI1 and T-XQ2-XI1. The compensation signals C-XI2-XI1 and C-XQ2-XI1 are subtracted in the DSP from the main data and passed after muxing/drivers to TX-XI1 (input to ODAC I1 as part of the OTDM PM-xQAM modulator). Once again, the other tributaries TX-XQ1, TX-XI2, TX-XQ2, TX-Yi1, TX-YQ1, TX-YI2, TX-YQ2, are processed accordingly.

According to a yet further variant of the arrangement of FIG. 11, the architecture can be extended by an adaptive closed loop for filter parameters which uses the coherent receiver as sensor instead of a distinct downsampler in the TX section. For that, an optical switch comprising MZM/VOA or optical ring resonator 1010 shown in FIG. 10 for a near-end loop on the SiP-PIC 1000 is used to improve/replace a pilot-tone based bias control of coherent transmitters.

Figure 13:
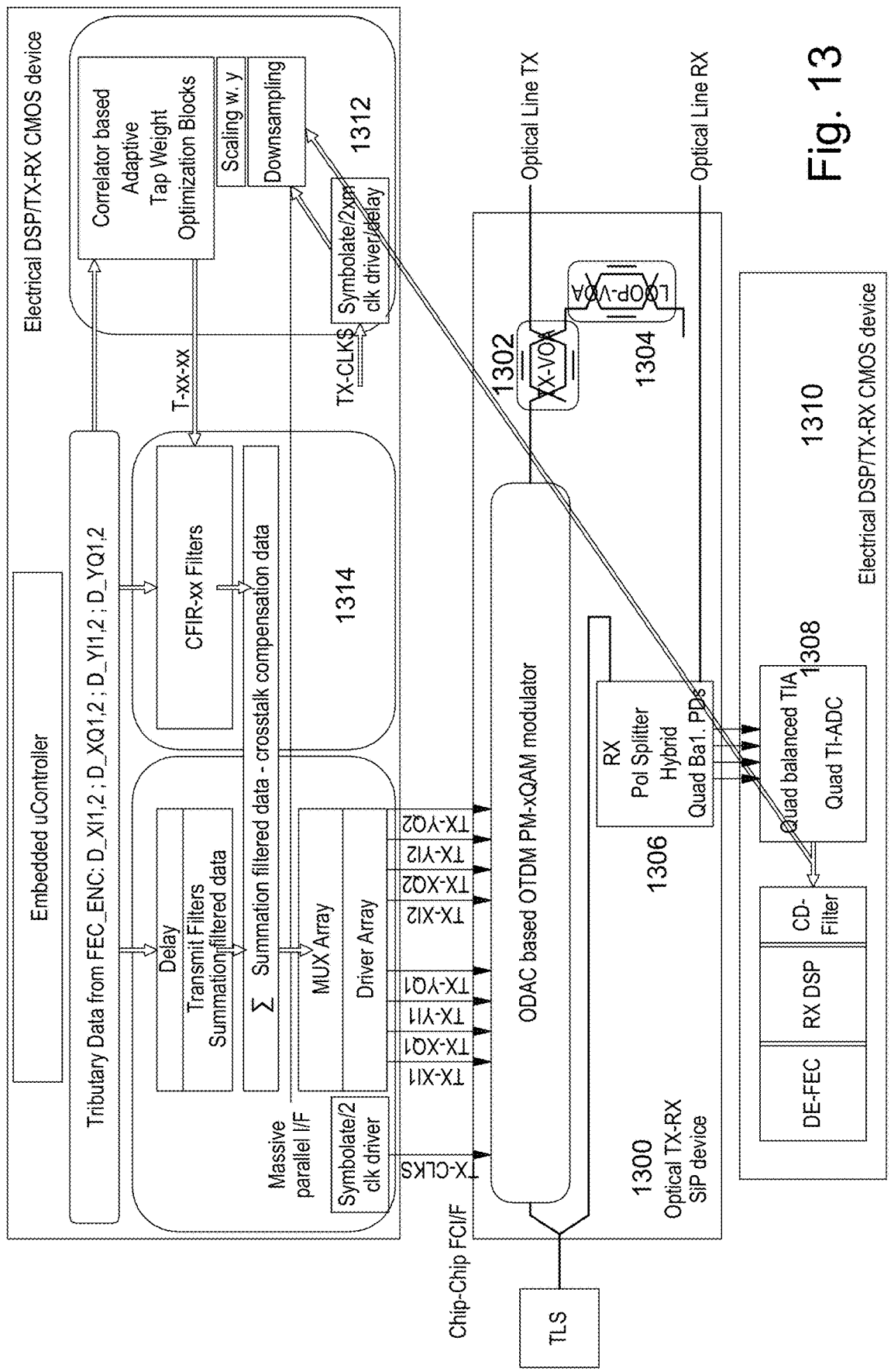
FIG. 13 shows alternative OTDM architecture.

Referring to FIG. 13, in comparison to the arrangement of FIG. 12, instead of using a distinct balanced photodiode and downsampler ADC block, the VOA/optical switch 1300 is used to either pass the TX signal in an offline situation (test, calibration, during start-up/power-up, maintenance events) via TX-VOA 1302 and LOOP-VOA 1304 or pass a small fraction of the TX-signal, from a splitter or TX-VOA 1302 and LOOP-VOA 1304 (acting as a switch/attenuator) for online tracking to a coherent receiver (RX) 1306 (depending on an acceptable ratio of RX-signal vs loop-back signal).

In the coherent receiver 1306, which is in the same photonic chip, after the coherent optical receiver with OE conversion by balanced photodiodes (PDs), the signals are passed to the oversampling high-speed quad TI-ADC 1308 in the RX chain of the electrical chip 1310, which is there to convert the optical line RX signal. The AD-converted signal contains in that case, additional to the RX, a low-level TX signal. The combined RX+TX digital signal is passed to a selector 1312 (to select X, Y, I, Q) and downsampled (to reduce the amount of data to be processed). After that it is scaled with a factor w, y and fed to the correlator based adaptive optimization blocks 1314. Processing and generation of the compensation signals in the CFIR-xx filters is then performed in a similar manner to that described with reference to FIG. 12.

In order to further minimize the impact on RX-OSNR of the method during online tracking it is possible for the TX level inserted into the RX to be small, for example of similar magnitude to dithering tones (1 . . . 3%). Alternatively, or in addition, instead of continuous operation in time, signal and processing may be chopped in time and synchronized to the downsampler. This can be controlled in a way that the time where it impacts the RX is short enough to be covered by the FEC/interleaver, or parameter drift due to environmental conditions and aging permit slowing down the algorithm processing, or, depending on the clocking scheme used in the RX (free running ADC, RX-synchronized ADC, TX synchronized ADC), interpolation schemes can be used for the feedback signal.

There can be further provided an adaptive algorithm to compensate inter-timeslot crosstalk due to limited extinction ratio; the skilled person will be familiar with appropriate algorithms to optimize the tap weightings in, for example, adaptive digital filters, for example least mean squares (LMS) and least-mean-magnitude-phase (LMMP) algorithms. In relation specifically to inter-timeslot crosstalk compensation, the circuitry and algorithm may use known approaches such as the "pilot LMS" or "signed error" or "signed" algorithm: in which the error function is reduced to 1b.

This allows implementation of the method with required properties with a minimum of fast/high accuracy/high resolution circuitry. The following aspects are observed: impulse response of inter-timeslot crosstalk due to limited ER to be compensated is short, so one complex tap per CFIR_xx (Crosstalk Compensation Finite Impulse Filter) is sufficient (affecting only next timeslot); no memory effects or spreading out to more than the neighbored timeslot are observed; generally the number of filter taps is arbitrary and might be enlarged as appropriate; no memory effect is encountered so that nonlinearity compensation to cover MZM sine shaped transfer function, if any, can be 1D table based; Data D_xxx (for xxx=XI1, XI2, XQ1, XQ2, YI1, YQ1, YI2, YQ2) for 144QAM are 12 values (+/−1, +/−3, +/−5, +/−7, +/−9, +/−11) to be coded as 4b binary numbers; Data D_xxx are uncorrelated, statistically independent data; it is possible to integrate over high number of symbols (N=several 1000s); slow drift occurs such that convergence time is of minor interest, because underlying crosstalk mechanism is very stable over time and changes over environmental conditions and aging mainly, so convergence rate might be slow; scan timing position is over 2+ symbols to identify correct delay settings.

For example, a recursive equation for coefficient adaptation (n=time steps, γ being a scaling coefficient, $e_n$=output of ADC function) is:

$$T\_xx\_xx_{n+1} = T\_xx\_xx_n + \gamma D\_xx\ xx_n\ \mathrm{sign}(e_n)$$

For synchronization (mainly delay calibration and tracking) of the test ADC (being RX or dedicated coherent receivers) known methods may be used (by design, available pilot tone or FAWs (frame alignment word)).

For a complete coherent system, the receiver may contain an e-field-to-Digital conversion with similar or even higher analog bandwidth as the transmitter. The ADC closed loop feedback control scheme as described may use such an optical-to-digital conversion, especially regarding the sub-ps timing resolution and equivalent analog bandwidth, but at a low conversion rate as discussed in relation to FIG. 12. A scheme to achieve that with the same technology platform SiP/CMOS is to apply the structure given in L. Richard Carley, Tamal Mukherjee "High-speed Low-Power Integrating CMOS Sample-and-Hold Amplifier Architecture" IEEE 1995 Custom Integrated Circuits Conference (CICC), pp. 543-546 for an ADC. Here a "windowed integration method" is applied to a sampler as first stage of an AD conversion. Taking into account that a photodiode is a photon-controlled current source, the photo current is sampled by a switch and the resulting current peak integrated directly onto a capacitor (or pair of capacitors for a differential case, or just the parasitic capacitance of the interface), without an intermediate V/I conversion (thus omitting the trans-impedance amplifier (TIA)). The voltage on the capacitor is AD converted at lower speed. After conversion, the capacitor is reset to an appropriate bias voltage. Carley et al also describes the use of this scheme for a Time-Interleaved (TI) sampler for TI-ADC, as required for a full rate conversion. As this reduces the noise (main contribution is just kT/C), there is no thermal noise due to the feedback resistance of a TIA. The scheme is especially advantageous, if high timing resolution and sub-ps aperture time at low conversion rate are required, as the reset phase can last a long time and memory effect is minimized. The analog BW for the windowed integration approach is mainly dependent on the behavior of the current switch only. If the primary switch is not implemented as an electrical circuit, but as an optical switch prior to the Photo Diode, (MZM or photonic ring modulator), the high analog BW of optics can be made available to the optical e-field-to-digital conversion. Thus, it can be seen that the hybrid electro-optic approaches using an optical switch in an SiP platform, together with preparation and evaluation on the electrical side (CMOS) which are described for the digital-to-e-field conversion above may be used for optical e-field-to-digital conversion as well.

It will be appreciated that the approaches described herein can be implemented in any appropriate fashion, and individual features can be combined, replaced or juxtaposed as will be apparent to the skilled reader.

What is claimed is:

1. An optical modulator comprising:
   a first transmitter chain and a second transmitter chain;
   a first optical time division multiplex generator upstream of said first transmitter chain and said second transmitter chain and configured to generate time interleaved optical pulses and transmit the time interleaved optical pulses to said first transmitter chain and said second transmitter chain;
   a second optical time division multiplex generator and a third optical time division multiplex generator downstream of said first transmitter chain and said second transmitter chain and configured to receive the time interleaved optical pulses from said first transmitter chain and said second transmitter chain; and
   a finite impulse response filter configured to provide correction signals for use by respective tributaries of the optical modulator.

2. The optical modulator as claimed in claim 1, wherein at least one of the first transmitter chain and the second transmitter chain includes an optical digital-to-analog converter.

3. The optical modulator as claimed in claim 1, wherein the optical modulator is implemented in complementary metal oxide silicon (CMOS).

4. The optical modulator as claimed in claim 3, wherein the optical modulator is a semiconductor-instigator-semiconductor capacitor (SisCap) modulator.

5. The optical modulator as claimed in claim 1, wherein the first optical time division multiplex generator is a Mach Zehnder modulator.

6. The optical modulator as claimed in claim 5, wherein the Mach Zehnder modulator is segmented, and further including a resonator component per segment.

7. The optical modulator as claimed in claim 1, wherein the finite impulse response filter has a finite impulse response filter parameter that is adapted based on a digital signal derived from an optical signal.

8. The optical modulator as claimed in claim 1, wherein the finite impulse response filter has a finite impulse response filter parameter that is adapted based on a transmit signal received at a coherent optical receiver.

9. An optical modulation method performed by an optical modulator including a first transmitter chain and a second transmitter chain, a first optical time division multiplex generator upstream of said first transmitter chain and said second transmitter chain, and a second optical time division multiplex generator and a third optical time division multiplex generator downstream of said first transmitter chain and said second transmitter chain, the method comprising:
generating time interleaved optical pulses by the first optical time division multiplex generator;
transmitting, by the first optical time division multiplex generator, the time interleaved optical pulses to the first transmitter chain and the second transmitter chain;
receiving, at the second optical time division multiplex generator and the third optical time division multiplex generator, the time interleaved optical pulses from the first transmitter chain and the second transmitter chain;
generating, by a finite impulse response filter, correction signals for use by respective tributaries of the optical modulator; and
transmitting an optical signal into an optical fiber based on the time interleaved optical pulses and the correction signals.

10. The method as claimed in claim 9, further comprising:
adapting a finite impulse response filter parameter of the finite impulse response filter based on a digital signal derived from an optical signal.

11. The method as claimed in claim 9, further comprising:
adapting a finite impulse response filter parameter of the finite impulse response filter based on a transmit signal received at a coherent optical receiver.

12. An optical modulator comprising:
a first transmitter chain and a second transmitter chain;
a first optical time division multiplex generator upstream of said first transmitter chain and said second transmitter chain and configured to generate time interleaved optical pulses and transmit the time interleaved optical pulses to said first transmitter chain and said second transmitter chain;
a second optical time division multiplex generator and a third optical time division multiplex generator downstream of said first transmitter chain and said second transmitter chain and configured to receive the time interleaved optical pulses from said first transmitter chain and said second transmitter chain; and
a finite impulse response filter configured to provide correction signals to respective tributaries of the first transmitter chain and the second transmitter chain.

13. The optical modulator of claim 12, wherein the finite impulse response filter has a finite impulse response filter parameter that is adapted based on a digital signal derived from an optical signal.

14. The optical modulator of claim 12, wherein the finite impulse response filter has a finite impulse response filter parameter that is adapted based on a transmit signal received at a coherent optical receiver.

15. An optical modulation method performed by an optical modulator including a first transmitter chain and a second transmitter chain, a first optical time division multiplex generator upstream of the first transmitter chain and the second transmitter chain, and a second optical time division multiplex generator and a third optical time division multiplex generator downstream of the first transmitter chain and the second transmitter chain, the method comprising:
generating time interleaved optical pulses by the first optical time division multiplex generator;
receiving, at the first transmitter chain and the second transmitter chain, the time interleaved optical pulses generated by the first optical time division multiplex generator;
receiving, at the second optical time division multiplex generator and the third optical time division multiplex generator, the time interleaved optical pulses from the first transmitter chain and the second transmitter chain;
generating, by a finite impulse response filter, correction signals for respective tributaries of the first transmitter chain and the second transmitter chain; and
transmitting an optical signal into an optical fiber based on the time interleaved optical pulses and the correction signals.

16. The method as claimed in claim 15, further comprising:
adapting a finite impulse response filter parameter of the finite impulse response filter based on at least one of a digital signal derived from an optical signal or a transmit signal received at a coherent optical receiver.

* * * * *

UNITED STATES PATENT AND TRADEMARK OFFICE
CERTIFICATE OF CORRECTION

PATENT NO. : 11,949,498 B2
APPLICATION NO. : 17/516879
DATED : April 2, 2024
INVENTOR(S) : Thomas Duthel et al.

It is certified that error appears in the above-identified patent and that said Letters Patent is hereby corrected as shown below:

In the Claims

Claim 4, Column 14, Lines 60-61, please replace "the optical modulator is a semiconductor-instigator-semi-conductor" with --the optical modulator is a semiconductor-insulator-semiconductor--

Signed and Sealed this
Sixth Day of August, 2024

Katherine Kelly Vidal
*Director of the United States Patent and Trademark Office*